United States Patent
Baxter

(10) Patent No.: US 7,114,055 B1
(45) Date of Patent: Sep. 26, 2006

(54) REDUCED INSTRUCTION SET COMPUTER ARCHITECTURE WITH DUPLICATION OF BIT VALUES FROM AN IMMEDIATE FIELD OF AN INSTRUCTION MULTIPLE TIMES IN A DATA WORD

(75) Inventor: Michael A. Baxter, Mountain View, CA (US)

(73) Assignee: Xilinx, Inc., San Jose, CA (US)

( * ) Notice: Subject to any disclaimer, the term of this patent is extended or adjusted under 35 U.S.C. 154(b) by 437 days.

(21) Appl. No.: 10/675,759

(22) Filed: Sep. 29, 2003

(51) Int. Cl.
*G06F 15/76* (2006.01)

(52) U.S. Cl. .................. 712/37; 712/223; 712/224; 712/300; 714/801

(58) Field of Classification Search ........ 712/223–224, 712/37, 300
See application file for complete search history.

(56) References Cited

U.S. PATENT DOCUMENTS

| | | | |
|---|---|---|---|
| 3,838,393 A * | 9/1974 | Dao | 714/801 |
| 4,829,460 A * | 5/1989 | Ito | 708/209 |
| 5,481,743 A | 1/1996 | Baxter | |
| 5,606,520 A * | 2/1997 | Gove et al. | 708/491 |
| 5,826,096 A | 10/1998 | Baxter | |
| 6,308,253 B1 * | 10/2001 | Gadre et al. | 712/41 |
| 6,934,828 B1 * | 8/2005 | Parthasarathy et al. | 711/215 |

OTHER PUBLICATIONS

Wakerly, John F. Digital Design: Principles and Practices. 3rd Ed. Prentice Hall: 2000. p. 20.*
TMS320C6000 CPU and Instruction Set Reference Guide, Texas Instruments: 2000. p. 5-260.*
Xilinx Inc., "MicroBlaze Processor Reference Guide," Embedded Development Kit, Apr. 1, 2003, pp. 1-134, (v3.2), available from Xilinx, Inc., 2100 Logic Drive, San Jose, CA 95124.

* cited by examiner

*Primary Examiner*—Eddie Chan
*Assistant Examiner*—Ryan Fiegle
(74) *Attorney, Agent, or Firm*—Pablo Meles; LeRoy D. Maunu

(57) ABSTRACT

A reduced instruction set computer architecture implemented on a field programmable gate array includes a parallel bit shifter capable of reversible shifts and bit reversals, a Reed-Muller Boolean unit coupled to the parallel bit shifter and an immediate instruction function using a half-word literal field in an instruction word that impacts a whole word logically through a combination of modes that variously manipulates the distribution of a set of literal bits of the half-word literal field across the instruction word.

37 Claims, 9 Drawing Sheets

FIG. 1A

| 0 | 4 | 5 | 7 | 8 | 11 | 12 | 15 | 16 | 19 | 20 | 23 | 24 | 31 |
|---|---|---|---|---|----|----|----|----|----|----|----|----|----|
| F |   | H |   | AM |   | T |   | S |   | R |   | O |    |

FIG. 1B

| 0 | 4 | 5 | 7 | 8 | 29 | 30 | 31 |
|---|---|---|---|---|----|----|----|
| F |   | H |   | A22 |  | BM |    |

FIG. 1C

| 0 | 4 | 5 | 7 | 8 | 11 | 12 | 15 | 16 | 31 |
|---|---|---|---|---|----|----|----|----|----|
| F |   | H |   | CM |   | T |   | I16 |    |

FIG. 1D

| 0 | 4 | 5 | 7 | 8 | 11 | 12 | 15 | 16 | 19 | 20 | 31 |
|---|---|---|---|---|----|----|----|----|----|----|----|
| F |   | H |   | P |   | T |   | S |   | TV12 |   |

FIG. 1E

| 0 | 4 | 5 | 7 | 8 | 11 | 12 | 15 | 16 | 19 | 20 | 23 | 24 | 31 |
|---|---|---|---|---|----|----|----|----|----|----|----|----|----|
| F |   | H |   | TM |   | T |   | S |   | R |   | SI8 |   |

FIG. 1F

| 0 | 31 |
|---|----|
| implementation dependent | |

| 0 | 1 | 2 | 3 | 4 | 5 |
|---|---|---|---|---|---|
| 1 | 1 | 1 | 1 | 1 | 1 |

| 0 | 7 | 8 | 15 | 16 | 23 | 24 | 31 |
|---|---|---|---|---|---|---|---|
| byte 3 | | byte 2 | | byte 1 | | byte 0 | |

FIG. 6

| 0 | 7 | 8 | 15 | 16 | 23 | 24 | 31 |
|---|---|---|---|---|---|---|---|
| address + 0 | | address +1 | | address + 2 | | address + 3 | |

FIG. 7

| 0 | 31 |
|---|---|
| address | |

FIG. 8

| 0 | 31 |
|---|---|
| byte address | |

FIG. 9

| 0 | 30 | 31 |
|---|---|---|
| half-word address | | X |

FIG. 10

| 0 | 29 | 30 | 31 |
|---|---|---|---|
| word address | | X | X |

FIG. 11

| 0 | 29 | 30 | 31 |
|---|---|---|---|
| instruction address | | 0 | 0 |

FIG. 12

| 0 | 1 | 2 | 3 | 4 | 17 | 18 | 19 | 20 | 31 |
|---|---|---|---|---|---|---|---|---|---|
| N | V | C | Z | undefined | | TE | IE | IV12 | |

FIG. 13

| 0 | 31 |
|---|---|
| instruction from JTAG port | |

FIG. 14

| 0 | 31 |
|---|---|
| external data I/O via JTAG port | |

FIG. 15

| 0 | address set via JTAG port | 31 |

FIG. 16

| 0 | PC return address from trap/interrupt | 31 |

FIG. 17

| 0 | PSR context data from trap/interrupt | 31 |

FIG. 18

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | $I_0$ | $I_1$ | $I_2$ | $I_3$ | $I_4$ | $I_5$ | $I_6$ | $I_7$ | $I_8$ | $I_9$ | $I_{10}$ | $I_{11}$ | $I_{12}$ | $I_{13}$ | $I_{14}$ | $I_{15}$ |

FIG. 19

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| $I_0$ | $I_1$ | $I_2$ | $I_3$ | $I_4$ | $I_5$ | $I_6$ | $I_7$ | $I_8$ | $I_9$ | $I_{10}$ | $I_{11}$ | $I_{12}$ | $I_{13}$ | $I_{14}$ | $I_{15}$ | 0 | 0 | 0 | 0 | 0 | 0 | 0 | 0 | 0 | 0 | 0 | 0 | 0 | 0 | 0 | 0 |

FIG. 20

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| $I_0$ | $I_1$ | $I_2$ | $I_3$ | $I_3$ | $I_4$ | $I_4$ | $I_5$ | $I_5$ | $I_6$ | $I_6$ | $I_7$ | $I_7$ | $I_8$ | $I_8$ | $I_9$ | $I_9$ | $I_{10}$ | $I_{10}$ | $I_{11}$ | $I_{11}$ | $I_{12}$ | $I_{12}$ | $I_{13}$ | $I_{13}$ | $I_{14}$ | $I_{14}$ | $I_{15}$ |

FIG. 21

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| $I_0$ | $I_0$ | $I_0$ | $I_0$ | $I_0$ | $I_0$ | $I_0$ | $I_0$ | $I_0$ | $I_0$ | $I_0$ | $I_0$ | $I_1$ | $I_2$ | $I_3$ | $I_4$ | $I_5$ | $I_6$ | $I_7$ | $I_8$ | $I_9$ | $I_{10}$ | $I_{11}$ | $I_{12}$ | $I_{13}$ | $I_{14}$ | $I_{15}$ |

FIG. 22

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | 0 | 1 | H | | | | CM | | | | T | | | | I16 | | | | | | | | | | | | | | | |

FIG. 23

| CM[0:3] | operation mode | bit mask mode | composite immediate instruction |
|---|---|---|---|
| 0000<br>0001<br>0010<br>0011 | and<br>or<br>xor<br>add | fill low<br>low<br>low<br>low | imm_and_fill_low<br>imm_or_low<br>imm_xor_low<br>imm_add_low |
| 0100<br>0101<br>0110<br>0111 | and<br>or<br>xor<br>add | fill high<br>high<br>high<br>high | imm_and_fill_high<br>imm_or_high<br>imm_xor_high<br>imm_add_high |
| 1000<br>1001<br>1010<br>1011 | and<br>or<br>xor<br>add | dplx<br>dplx<br>dplx<br>dplx | imm_and_dplx<br>imm_or_dplx<br>imm_xor_dplx<br>imm_add_dplx |
| 1100<br>1101<br>1110<br>1111 | and<br>or<br>xor<br>add | sign<br>sign<br>sign<br>sign | imm_and_sign<br>imm_or_sign<br>imm_xor_sign<br>imm_add_sign |

REDUCED INSTRUCTION SET COMPUTER ARCHITECTURE WITH DUPLICATION OF BIT VALUES FROM AN IMMEDIATE FIELD OF AN INSTRUCTION MULTIPLE TIMES IN A DATA WORD

REFERENCE TO A COMPUTER PROGRAM LISTING APPENDIX

This application includes a computer program-listing appendix on a single compact disc, the contents of which are incorporated herein by reference in their entirety. The compact disc contains a first 5 KB file entitled "boole32_v.txt", a second 23 KB file entitled "gpr_regfile_v.txt", and a third 37 KB file entitled "slr32_v.txt", all of which were created on Sep. 12, 2003. A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to computer architecture, and more particularly to a reduced instruction set computer architecture using a field programmable gate array.

BACKGROUND OF THE INVENTION

Programmable devices are a class of general-purpose integrated circuits that can be configured for a wide variety of applications. Such programmable devices have two basic versions, mask programmable devices, which are programmed only by a manufacturer, and field programmable devices, which are programmable by the end user. In addition, programmable devices can be further categorized as programmable memory devices or programmable logic devices. Programmable memory devices include programmable read only memory (PROM), erasable programmable read only memory (EPROM) and electronically erasable programmable read only memory (EEPROM). Programmable logic devices include programmable logic array (PLA) devices, programmable array logic (PAL) devices, erasable programmable logic devices (EPLD) devices, and programmable gate arrays.

As chip capacity continues to increase, the use of field programmable gate arrays (FPGAs) is quickly replacing the use of application specific integrated circuits (ASICs). An ASIC is a specialized integrated circuit that is designed for a particular application and can be implemented as a specialized microprocessor. Notably, a FPGA is a programmable logic device (PLD) that has a number of electronic gates approaching that of large ASICs, however a FPGA is significantly more flexible. Notably, FPGAs can be designed using a variety of architectures that can include user configurable input/output blocks (IOBs), and programmable logic blocks having configurable interconnects and switching capability.

The advancement of computer chip technology has also resulted in the development of embedded processors and controllers. An embedded processor or controller can be a microprocessor or microcontroller circuitry that has been integrated into an electronic device as opposed to being built as a standalone module or "plugin card." Advancement of FPGA technology has led to the development of FPGA-based system-on-chips (SoC) including FPGA-based embedded processor SoCs. A SoC is a fully functional product having its electronic circuitry contained on a single chip. While a microprocessor chip requires ancillary hardware electronic components to process instructions, an embedded processor SoC would include all required ancillary electronics within the chip. For example, a SoC for a cellular telephone can include a microprocessor, encoder, decoder, digital signal processor (DSP), RAM and ROM. A SoC could also include multiple processing modules coupled to each other via a bus or several busses. It should also be understood herein that "FPGA-based embedded processor SoCs" are a specific subset of FPGA-based SoCs that would include their own processors.

In order for device manufacturers to develop FPGA-based SoCs or FPGA-based embedded processor SoCs, it is necessary for them to acquire or develop system components and/or related technologies that are utilized to create the FPGA-based SoCs. These system components and/or technologies are called cores or Intellectual Property (IP) cores. An electronic file containing system component information can typically be used to represent the core. A device manufacturer will generally acquire several cores that are integrated to fabricate the SoC. More generally, the IP cores can form one or more of the processing modules in an FPGA-based SoCs. The processing modules can either be hardware or software based.

Notwithstanding advantages provided by using FPGA-based SoCs, the development of these SoCs can be very challenging. One of the challenges includes communication among multiple hardware and software processors embedded in a FPGA-based SoC. Typically, such communication occurs over a bus. Unfortunately, the embedded processors in a FPGA-based SoC are treated as a separate computer requiring the use of a C compiler and a runtime stack or a conventional heap data structure. Additionally, existing FPGA-based embedded processor SoCs require several programming languages to specify the entire design system. In particular, a system may require both a high-level software language and a hardware descriptive language (HDL) to define the hardware in the FPGA for the system solution. Furthermore, such existing systems require a Real Time Operation System (RTOS). FPGA based embedded processor SoCs are being introduced into the market, but there are no solutions that allow users to customize the system, the hardware and software processing modules and the associated software, nor are there systems that enable a user to tradeoff a function that is implemented in hardware (FPGA fabric) or software (running on the embedded processor). Nor is there a system that is optimized for a soft-fabric processor (or "soft" processor) to be implemented efficiently in the fabric of a field programmable gate array. It would be desirable to have a reduced instruction set computer (RISC) core that is intended for efficient physical implementation using an FPGA, well-balanced for embedded applications within the FPGA fabric, and able to be synthesized from HDL code with high performance. With this in mind, the RISC core would be ideally implemented with efficient resource utilization, small footprint utilization within the FPGA, high performance, as well as capable of supporting the unique problems of realtime software.

SUMMARY OF THE INVENTION

A reduced instruction set computer implemented on a FPGA in accordance with the present invention includes the attributes of having a highly efficient FPGA resource utilization and a datapath having a unique Boolean unit and an efficient parallel shifter as well as an immediate instruction designed for the architecture of the present invention.

In a first aspect of the present invention, a reduced instruction set computer architecture implemented on a field programmable gate array comprises a parallel bit shifter capable of reversible shifts and bit reversals, a Reed-Muller Boolean unit coupled to the parallel bit shifter, and an immediate instruction function that, via modes, variously manipulates the distribution of a set of literal bits of a half-word literal field from an instruction word across a full-length data word. Also, the Reed-Muller Boolean unit can perform any Boolean operation and an inverse of the Boolean operation on bit-parallel data words by changing only a single control bit value.

In a second aspect of the present invention, a system-on-chip comprises a reduced instruction set computer processor capable of implementation on a field programmable gate array fabric and a simple and balanced instruction set utilizing a minimal amount of resources from the field programmable gate array fabric, wherein the processor is synthesizable from hardware description language.

In a third aspect of the present invention, a method of forming a reduced instruction set computer processor can comprise the steps of embedding a processor core in look up tables of a field programmable gate array and deploying a simple instruction set optimized for a compiler, where the processor is directly synthesizable from a hardware description language.

In yet another aspect of the invention, a system-on-chip can include a reduced instruction set computer processor implemented on a field programmable gate array fabric, a simple and balanced instruction set utilizing a minimal amount of resources from the field programmable gate array fabric and a horizontally scalable immediate instruction using multiple vectorized versions of an N-bit architecture.

BRIEF DESCRIPTION OF THE DRAWINGS

FIGS. 1A–1F illustrate instruction forms in accordance with the present invention.

FIG. 5 is a 32-bit Data Word format illustrating the bit and byte order in accordance with the present invention.

FIG. 6 illustrates the address of bytes within the 32-bit Data Word of FIG. 5 in accordance with the present invention.

FIG. 7 illustrates the ordering of bits in a 32-bit address in accordance with the present invention.

FIG. 8 illustrates the address bits participating in byte addressing in accordance with the present invention.

FIG. 9 illustrates the address bits participating in half-word addressing in accordance with the present invention.

FIG. 10 illustrates the address bits participating in word addressing in accordance with the present invention.

FIG. 11 illustrates a program counter in accordance with the present invention.

FIG. 12 illustrates a processor status register (PSR) in accordance with the present invention.

FIG. 13 illustrates a debug instruction register (DIR) in accordance with the present invention.

FIG. 14 illustrates a debug instruction register (DIR) in accordance with the present invention.

FIG. 15 illustrates a debug address register (DAR) in accordance with the present invention.

FIG. 16 illustrates context register 0 (CR0) in accordance with the present invention.

FIG. 17 illustrates context register 1 (CR1) in accordance with the present invention.

FIG. 18 illustrates the immediate instruction I16 bit distribution for bit mask mode LOW in accordance with the present invention.

FIG. 19 illustrates the immediate instruction I16 bit distribution for bit mask mode HIGH in accordance with the present invention.

FIG. 20 illustrates the immediate instruction I16 bit distribution for bit mask mode DPLX in accordance with the present invention.

FIG. 21 illustrates the immediate instruction I16 bit distribution for bit mask mode SIGN in accordance with the present invention.

FIG. 22 illustrates the immediate instruction machine instruction bit patterns in accordance with the present invention.

FIG. 23 is a chart illustrating the constant modes supported by the immediate instruction in accordance with the present invention.

DETAILED DESCRIPTION OF THE DRAWINGS

Figure 2:
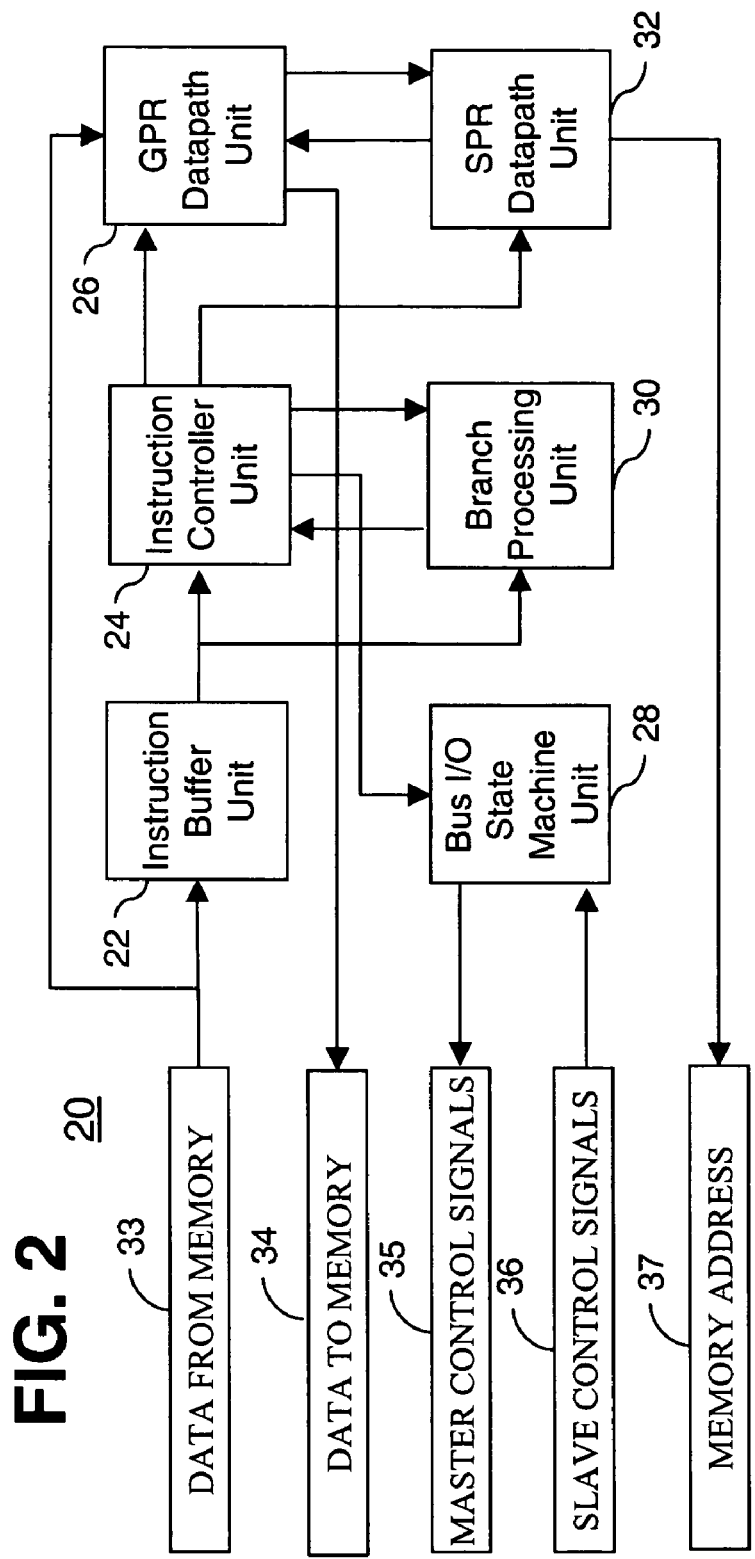
FIG. 2 depicts an exemplary block diagram of a SoftRISC processor in accordance with the inventive arrangements.

A software RISC processor in accordance with the present invention is an extremely fast, architecturally-balanced, compiler-friendly RISC soft-processor that can be implemented in less than 1200 look-up tables in a FPGA fabric. In one embodiment using Virtex-E technology available from Xilinx, Inc., it is estimated to operate at 180–200 MHz and offer at least 50 MIPs in performance. In one aspect of the invention, the architecture, using a 32-bit RISC processor as a base, is designed for upwardly compatible expansion with new instruction capabilities, such as for DSP or network processing, as well as a 64-bit or higher version. The architecture preferably uses a simple instruction set that is further synthesizable from HDL code, such as Verilog code, for minimal FPGA resources and optimal C compiler development effort. The architecture further preferably includes balanced instructions and addressing modes well-suited for embedded applications. For example, bitfield layouts of machine words are made for compatibility with on-chip FPGA IP cores and a standard well-specified bus, the On-Chip Peripheral Bus (OPB), is used. SoftRISC, as the invention is termed herein, is an entire enabling technology for several processors, all extremely fast.

Field programmable gate arrays (FPGA) have become very popular for a variety of other end user applications including telecommunication, Internet, switching, and routing applications. An FPGA includes programmable logic fabric (including programmable logic gates and programmable interconnects) and programmable input/output blocks. The programmable input/output blocks are fabricated on a substrate supporting the FPGA and are coupled to the pins of the integrated circuit, allowing users to access the programmable logic fabric. The programmable logic fabric may be programmed to perform a wide variety of functions corresponding to particular end user applications and may be implemented in a variety of ways.

In an embodiment of the SoftRISC processor, 5 major instruction formats are used, with one additional format available for the reserve for future use (rfu) instruction. In all instruction formats, except for the X-Form, bits 0–7 consist of a 5-bit F-field, which is a prefix opcode, and a 3-bit H-field, which is a C/C++ compiler hinting resource. The compiler hinting bits in the H-field are optionally used, and have the effect of optimizing instruction fetch operations when used. Each of the instruction formats can have a delineation as to how the 32 bits of the instruction are to be used. Note that data bit-orderings of the instructions, as shown in FIG. 5 and described below, follow IBM architectural tradition. The following are exemplary delineations of the A-Form, B-Form, C-Form, D-Form, M-Form and X-Form instruction formats.

As shown in FIG. 1A, the A-Form is for arithmetic and logic instructions. Bits 0–4 contain the F-field, or opcode. Bits 5–7 are the H-field compiler hinting bits. Bits 8–11 are the AM-field, which is the arithmetic mode field. The AM-field provides 16 encodings to modify the functionality of the base arithmetic instruction, while having no effect for the logical instructions. The A-Form instructions specify three GPR registers: T, R, and S, which are selected by fields in the instruction. The typical operation performed is T=R op S. The T-Field is located in bits 12–15, the S-Field is located in bits 16–19, and the R-Field is located in bits 20–23. Bits 24–31 must be set to 0.

As shown in FIG. 1B, the B-Form is for branch instructions. Bits 0–4 contain the F-field, or opcode. Bits 5–7 are the H-field compiler hinting bits. The branch operation selected depends on the F-field. All of the bits 8–29 comprise a field A22, which is a 22-bit immediate or literal data embedded within the instruction. Bits 30–31 contain a branch mode indicator field BM that enables relative or absolute branches, as well as the capability to enable pipelined execution of the instruction following the branch. For relative branches, the A22 immediate data can be transposed via a two-place left shift and sign-extension into a signed offset address value that is used to compute a branch target address that is pc-relative (program counter-relative). Alternatively, for absolute branches, the 21 lower bits are used as a absolute address to instruction words, through a two-place left shift, and 9 prepended zeros.

As shown in FIG. 1C, the C-Form is supports one instruction imm, or the immediate instruction. The imm instruction has 16 constant modes (CM) of operation, and the concept of this multifunction instruction will be discussed later in much greater detail. The primary function of the imm instruction is to provide single-instruction logical and arithmetic immediate data processing capabilities. This involves generating a bit mask from immediate data embedded within the instruction, and then performing logical or arithmetic operations with one selected GPR as the source and target register. What is special about this instruction is that a 16-bit immediate data field causes an effect in as many as 32-bits of the GPR used. The immediate data is interjected within the 32-bit datapath of the processor, but only requires only 16 bits of literal data to be carried within a single 32-bit instruction.

The C-Form bitfields can be delineated with bits 0–4 containing the F-field, or opcode, and bits 5–7 having the H-field compiler hinting bits. Bits 8–11 are the CM-field, which specifies 16 combinations for how the I16 literal data in bits 16–31 should be used to generate a bit mask, and what arithmetic or logical operation is performed with the bit mask and the selected GPR. Bits 12–15 are a T-field, which selects one of the GPRs. This GPR provides the source data and receives results of modification of the source data with the bit mask data. This process is controlled by the CM-field mode.

As shown in FIG. 1D, the D-Form is for instructions that operate with SPRs. This involves program and state modification. More particularly, bits 0–4 contain the F-field, or opcode. Bits 5–7 are the H-field compiler hinting bits. Bits 8–11 are the P-field, and are used to select SPRs when used with certain D-Form instructions. Bits 12–15 comprise the T-field, and bits 16–19 comprise the S-field. Each of these fields allows selection of one of the 16 GPRs. Bits 20–31 comprise the TV12 trap vector, which are only used with the trap instruction. Unlike the A-Form instructions, only one of the two GPR specifiers are used in an instruction. When a read from a special purpose register is performed, the T-field specifies the target GPR. When a write or logical operation involving a special register is performed, the S-field specifies the source GPR.

As shown in FIG. 1E, the M-Form is for memory reference instructions. The M-Form supports only 2 instructions, LD and ST. These instructions, however, have several modes for referencing memory in a variety of ways and for using specific capabilities of the OPB. The M-Form is delineated to include bits 0–4 containing the F-field, or opcode. Bits 5–7 are the H-field compiler hinting bits. Bits 8–11 comprise a TM-field, which composes the transfer mode of either the load or store instruction. The three GPR select fields, the T-field, S-field, and R-field, are encoded in bits 12–15, 16–19, and 20–23, respectively. This encoding for GPRs matches that of the A-Form instruction. However, only two fields are used for any M-Form instruction. Load instructions use the GPRs specified by the T-field and the R-field. Store instructions use the GPRs specified by the R-field and the S-field. Up to 16 possible transfer modes are encoded in the TM-field. Bits 24–31 form the SI8 field, which is an 8-bit unsigned address offset or "structure index" that may be optionally used for addressing to byte resolutions.

As shown in FIG. 1F, the X-Form supports the Reserve for Future Use (rfu) instruction, and is only architecturally defined with each of bits 0–4 set to 1. Bits 5 through 31 are intentionally implementation-dependent, and so are architecturally undefined. The rfu instruction, which uses the X-Form and is reserved for future use, is intended for application-dependent expansion or enhancement of the SoftRISC instruction set when deployed as a soft processor core. This capability may be utilized for specific core requirements, bug fixes, or for desired instruction enhancements to include special purpose functional units in the architecture. As previously mentioned, the rfu instruction can be used to provide upward compatibility or variant compatibility with minimal impact to fundamental compiler design for such architectures.

The code necessary for implementing the design of an FPGA-based SoC can be in a format such as a hardware description language (HDL). Note that in traditional SoC designs, the hardware is represented in HDL and the software portion in C. A HDL is a language used to describe the functions of an electronic circuit for documentation, simulation and/or logic or circuit synthesis. Verilog and VHSIC Hardware Description Language (VHDL) are standardized HDLs that are well known by those skilled in the art. Verilog and VHDL can be used to design electronic systems at the component, board and system level. They can facilitate the development of models at a high level of abstraction. Other HDLs and similar constructs now known or to be discovered can also be used to represent the system model. When an FPGA based SoC includes an embedded processor, such systems require the use of both high-level (or manually produced assembly) language and a HDL to define the hardware in the FPGA. The present invention has an advantage of obviating the need to compile conventional programming languages (such as C) into HDL or lower level logic.

An exemplary SoftRISC design in accordance with the invention requires between 980 and 1200 look-up tables (LUTs). This well-designed logic was developed using computer-generated design techniques, where any amount of Verilog code can be created quickly, compared to code generated manually. This allows the sidestepping of naive behavioral synthesis, substituting instead informed judgment for highly detailed structural Verilog that implements very efficiently in Xilinx's Virtex FPGAs. This solution can result in an extremely fast datapath logic for FPGAs. The architecture and the implementation are inherently intended to scale horizontally, such as to support strongly DSP-enabled and packet-processing variations. The implementation can also scale vertically, where the entire architecture could efficiently scale up to 64-bits and beyond, with simple O(n) complexity.

Aspects of a SoftRISC processor in accordance with the present invention include: an architecture that is balanced; an instruction set that is small yet complete and compiler friendly, requiring fewer emitted instructions for common operations in C/C++; a parallel shifter design affording reversible shifts and bit-reversal in a small number of slices of FPGA fabric; an immediate instruction having 16-bit literals to be used as 32-bit constants in entirely new ways compared to prior art computer design; a novel Reed-Muller Boolean unit, which eliminates the output multiplexer used in the canonical normal form of Boolean logic units that perform all 16 dyadic operations; clock speeds rivaling a PowerPC core when the SoftRISC processor is implemented, for example, in a Xilinx Virtex-II FPGA, which would further make hard/soft processor interconnect significantly easier for FPGA users and reduce the overall complexity of clock logic; an extremely efficient structural layer for FPGA devices due to the vast majority of the Verilog HDL being computer-generated; inherently expandable via X-code reserved-for-future-use instructions; upward scalability up to 64-bits or more (even up to 1024-bits) while impacting implementation complexity virtually linearly, thereby enabling implementation of a fast 64-bit soft-processor in about 2200 slices or less; and downward scalability down to 16- and 8-bits with virtually linear implementation complexity. The parallel shifter may contain integral bit-reversal hardware, facilitating, for example, FFT addressing for both decimation-in-time (DIT) and decimation-in-frequency (DIF) algorithms. The immediate instruction can be reused for processors from 8-bits to 64-bits and beyond in size, as well as deployed in state-machine designs.

It should be understood that embodiments in accordance with the present invention can be both horizontally (number of bits in a machine word) and vertically (number of architectural variants) scalable. In a system-on-chip (SoC), for example, having a software reduced instruction set computer (RISC) processor synthesizable from HDL, implemented on a field programmable gate array fabric and having a simple and balanced instruction set, an immediate instruction can be horizontally scalable using multiple vectorized versions of an N-bit architecture. The N-bit can be multiple 16-bit, 32-bit, 64 bit, 128-bit, 256-bit, 512-bit or 1024-bit vectorized versions of the architecture. For example, versions larger than 64-bits can be viewed as vectorized versions of the architecture, where 2 or more concurrent 64-bit words in the same computer can be supported. This capability can be in the realm of Xilinx DSP FPGA applications, where 2–4–8–16 words may be used concurrently for a digital filtering operation. Additionally, a 1024-bit variant may be used in a large-scale datacom switching application. Such a variant might be described as supporting multiple concurrent integer words of some smaller size, such as 16-bits. Again, the immediate instruction and the base architecture can scale to support such variants. This architecture can be thought of as a "hyper-vector," which contrasts with existing "hyperscalar" architectures.

With respect to the concept of a simple and balanced instruction set, embodiments in accordance with the present invention can use single and paired instructions that affect 3 system characteristics simultaneously: 1. hardware runtime efficiency (providing efficient FPGA realization); 2. software runtime efficiency (providing a small set of instructions to achieve a goal of operating C programs efficiently at runtime); and 3. compiler implementation efficiency (compiler simplicity as a result of depending on 1 and 2 above). Thus, with respect to the reduced complexity of the compiler, the instruction formats include a balance of single and paired instructions well-suited for compilation, such that after a first-issued instruction is considered by a compiler for issue, the compiler beneficially considers no more than 30 alternative instructions for a second-issued instruction to pair with the first-issued instruction. With respect to the reduced complexity of the instruction sequences required at runtime, instruction formats can include a balance of single and paired instructions well-suited for a C runtime software environment, such that instruction sequences required to implement C language constructs naturally break into sequences comprising at least one among one instruction and two instruction sequences. The single or paired instruction overhead can minimize interrupt latency and the minimal instruction overhead and the single and paired instructions facilitate interrupt driver software design directly in the C language.

In another embodiment, the immediate instruction can be for an 18-bit or 36-bit microcontroller version in an FPGA fabric that can use the respective 18-bit aspect ratio or 36-bit aspect ratios of a Xilinx Virtex-II, Virtex-II Pro, or Spartan 3 FPGA BlockRAM. For that matter, conceivable embodiments can include N-bit architectures having multiple 18-bit, 36-bit, 72 bit, 144-bit, 288-bit, 576-bit and 1152-bit vectorized versions.

The immediate instruction can also be used for a digital signal processor (DSP) version in relation to generating immediate data for an 18-bit embedded multiplier in a FPGA device. In one embodiment, the DSP can generate two N-bit words of constant data using an N/2-bit immediate instruction having N/4 bits dedicated for immediate data. The two N-bit words can comprise constants for a Fast Fourier Transform or in-phase and quadrature data (I & Q) for complex signal processing in algorithms for radio or data communications signal processing.

As previously mentioned, embodiments in accordance with the invention can also be vertically scalable. To enable such vertical scalability, an instruction set can include an rfu instruction (the X-Mode instruction) that enables vertically scalable architectural variants implemented on the field programmable gate array fabric irrespective of horizontal scalability. The rfu instruction can enable upward compatible single and double-precision floating-point arithmetic operations via the field programmable gate array fabric and can also use a single standard extension at a hardware/software boundary for variant architectures while minimally impacting a compiler design for the variant.

For example, DSP or multimedia instructions are supported by the rfu instruction for such architectural variants.

Or, alternatively, in a 16-bit microcontroller form, the rfu instructions may support access for specialized peripheral registers as implemented in that form of architectural variant. In all these cases, the core compiler algorithms (for implementing a C++ compiler, for example) would be greatly overlapping, thereby reducing the effort required to support numerous similar-but-different architectural variants.

The SoftRISC processor in one embodiment is a 32-bit RISC architecture intended for efficient physical implementation as a soft processor core in Xilinx Virtex-E FPGAs. In this section, the general organization of the processor is summarized as an introduction to the facilities of the architecture. It should be understood that the present invention as claimed is not limited to the exemplary implementation described below, but can apply to other FPGA embedded processor architectures which can vary significantly from the exemplary implementation.

The implementation of a soft processor core having a very small footprint, for example a soft processor core comprising less than 1200 LUTs, is a significant challenge and goal. Further practical implementation issues have also brought to light additional concepts such as those relating to instruction buffering, minimal instruction, pipelining, uniform instruction size, branch address lengths, immediate instruction capability, software management of exceptions, alternative logics and datapath design.

With respect to instruction buffering, a key issue in RISC computers is attaining a high instruction throughput rate, such as the goal in this design of 1 clock cycle per instruction (CPI). Rather than use multiple sets of memory I/O buses typical to the Harvard computer architecture, this design used a much simpler traditional Von Neumann architecture. The key is to exploit a simple shift-register as a pipelined instruction buffer, and to perform instruction fetch with burst fetch operations. This logic achieves close to 1 CPI for most non-pathological code sequences, and does not require or even benefit from a cache. To support this simple implementation hardware, the architecture includes an advanced instruction look-ahead bitfield encoding capability, which are the H-field compiler hinting bits (available with all instructions except the rfu instruction). This concept is adapted from some aspects of multithreading architecture (MTA) in that the instruction-issue logic may re-order and concurrently schedule instructions that have non-conflicting hints (as encoded in their respective H-fields). The present invention, however, does not require the aspect of MTAs involving multiple program counters.

The main idea of minimalism in this embodiment is to support only the instructions that a C compiler needs, while reducing the total opcode space to a small size (only 31 of 32 opcodes were used). Then, for some instructions that need to have additional dependent functionality, instruction modes are provided to these instructions to expand their capability. The overall effect of the SoftRISC machine instruction set on the control logic implementation is very efficient instruction decoding, and shallow pathways into a relatively small set of programmable logic arrays (PLAs) driven by sequential logic that follows along with pipeline processing.

With respect to pipelining issues in this Load/Store pipelined machine, datapath logic that is pipelined is more individuated, rather than grouped. For instance, the concept of a single ALU is not as efficient as separate logic for addition and shifting. So, one goal of the implementation is seeking an optimal mix of separate datapath elements that are individually pipelined, rather than forcing a procrustean aggregation of logic having conventional boundaries. This is facilitated in flexible implementation technologies such as FPGAs, for example the Xilinx Virtex FPGA, and not a custom silicon design. Thus, it is more desirable to formulate computer logic based on what the FPGA "wants", rather than any preconceived or conventional notion of the designer's wants.

Having essentially only one instruction size, and having that size be the normal 32-bit machine wordlength (for this exemplary 32-bit design) simplifies the design. There are many fewer cases to manage for pipelining, and much simpler instruction addressing logic results.

A large branch address length is necessary to avoid procrustean limitations in the compiler and linker. This advantageously has no additional cost in the implementation, since 32-bit addressing is already part of the design. All instruction addressing can be left-shifted two places in order to point to an actual word address for an instruction. This results in no wasted bits.

In one aspect of the present invention, the branch offset may be preplaced within the instruction already shifted in-place. The 2-bit branch mode indicator fills the bottom 2 bits of the instruction, allowing routing of the branch offset within address processing logic with no shifting. This is shown in FIG. 1B, where the 22-bit branch offset is shown as A22 as part of the B-Form ("branch") instruction. As can be seen, the 22-bit offset is already left-shifted, and subsequently sign-extended to form a branch offset having, in effect, 24-bits of addressing range.

The literal mode or immediate instruction provides a mechanism for compilers to implement many essential parts of programs. Compilers for modern processors tend to generate a lot of code that works with tiny units of data, such as small constants, or increments used for loop accounting and indexing. Thus, it is important to have an immediate instruction capability that is sufficiently capable and that is mindful of FPGA implementation issues. For example, a C++ compiler may use this mode to produce very fast inlined arithmetic code in numerous cases, in contrast to other computer architectures. For general processing, this facility also gives the compiler very flexible capabilities for generating fast code containing, for instance, ordinals (e.g., unsigned numbers used for addressing), integer constants, offsets, array indexing, bounds checking, and some floating-point constants. This very flexible immediate instruction capability can also speed the inner loops for common situations encountered by a compiler with general code, irrespective of the benefits to arithmetic or library code. The immediate instruction, as implemented and described herein, provides immediate data in an instruction without requiring either additional instruction words or instructions in non-integral machine word sizes. The immediate instruction may be used in alternative soft-fabric FPGA computers, and other embedded processor cores and microprocessor designs.

Software management of exceptions works well in a SoftRISC implementation. Exceptions are either synchronous or asynchronous in SoftRISC. For the asynchronous exception, only a single interrupt pin is provided, with the expectation that software may be used to manage substantially all interrupt processing in the embedded application. This has the impact of greatly simplifying the control path logic over a multi-level priority scheme. Additionally, the computer architecture literature supports a software-based schema; hardware schemes only complicate software interrupt dispatch. Accordingly, this works well for reducing FPGA LUT utilization.

With respect to alternative logics, it is desirable to use a Boolean unit for multiple functions, such as for bit generation and multiplexing. A highly efficient implementation uses Reed-Muller logics. The Reed-Muller logic results in a solution requiring only 2 LUTS per bit processed. This is more efficient than a Boolean unit constructed with a conventional Disjunctive Canonical Form (DCF) expression, because only a final OR (not a multiplexer) is necessary to join the output of two 4-LUTs. There may be additional beneficial uses of Reed-Muller logic schemas, such as for accelerating arithmetic and other operations.

A block diagram of a SoftRISC implementation 20 in accordance with the present invention is shown in FIG. 2. The implementation can include a instruction buffer unit 22, an instruction controller unit 24, a general purpose register (GPR) datapath unit 26, bus I/O state machine unit 28, branch processing unit 30, and special purpose register (SPR) datapath unit 32, as well as data from memory 33, data to memory 34, master control signals 35, slave control signals 36 and memory address 37, as shown. Although the data from memory 33 and data to memory 34 are shown as separate unidirectional buses, it is understood that they may work as a unit to form a single (bi-directional) bus.

Figure 3:
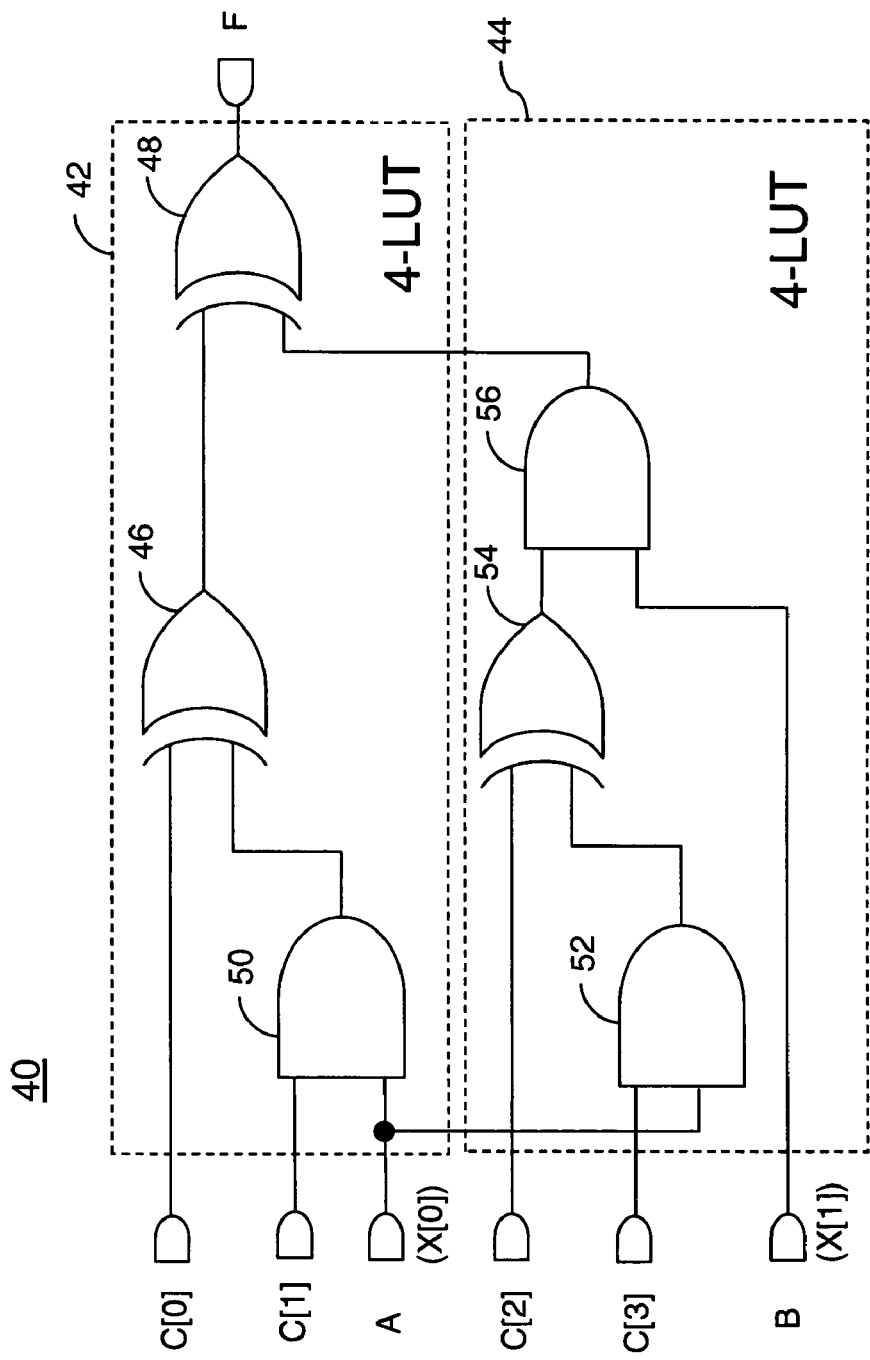
FIG. 3 depicts an exemplary block diagram of a Reed-Muller Universal Logic Module in accordance with the present invention.

The GPR datapath unit 26 will now be discussed in further detail, particularly with respect to the implementation of the Boolean Unit. The subject of Reed-Muller logics is beyond the scope of this application and is well known to those of ordinary skill in the art. An efficient implementation of a complete binary function unit 40 is shown in FIG. 3, where only 2 4-LUTs, such as those found in Virtex FPGAs, are used per bit. 4-LUT 42 includes AND gate 50 and XOR gates 46 and 48, while 4-LUT 44 includes AND gates 52 and 56 and XOR gate 54. Such an arrangement naturally packs well into a single slice of an FPGA, affording 2-bits per configurable logic block (CLB) (for example, for Virtex-E). This Reed-Muller circuit is also beneficial in the SoftRISC FPGA implementation because of the optimum distribution of functional control codes. For instance, changing any operation to its logical inverse requires changing only a single control bit. Another feature is that multiplexing between two input operands can be performed by transposition of lone control bits (since the bit patterns for selecting inputs is sparse). These and other features, such as selecting a function in a data dependent way (like a sign bit) are hallmark characteristics of Reed-Muller logic. The elegant distribution of function control codes helps reduce the overall control path PLA complexity in SoftRISC. The appendix includes file boole32_v.txt, which has an example of a 32-bit Verilog implementation of such a Reed-Muller Boolean unit.

Figure 4:
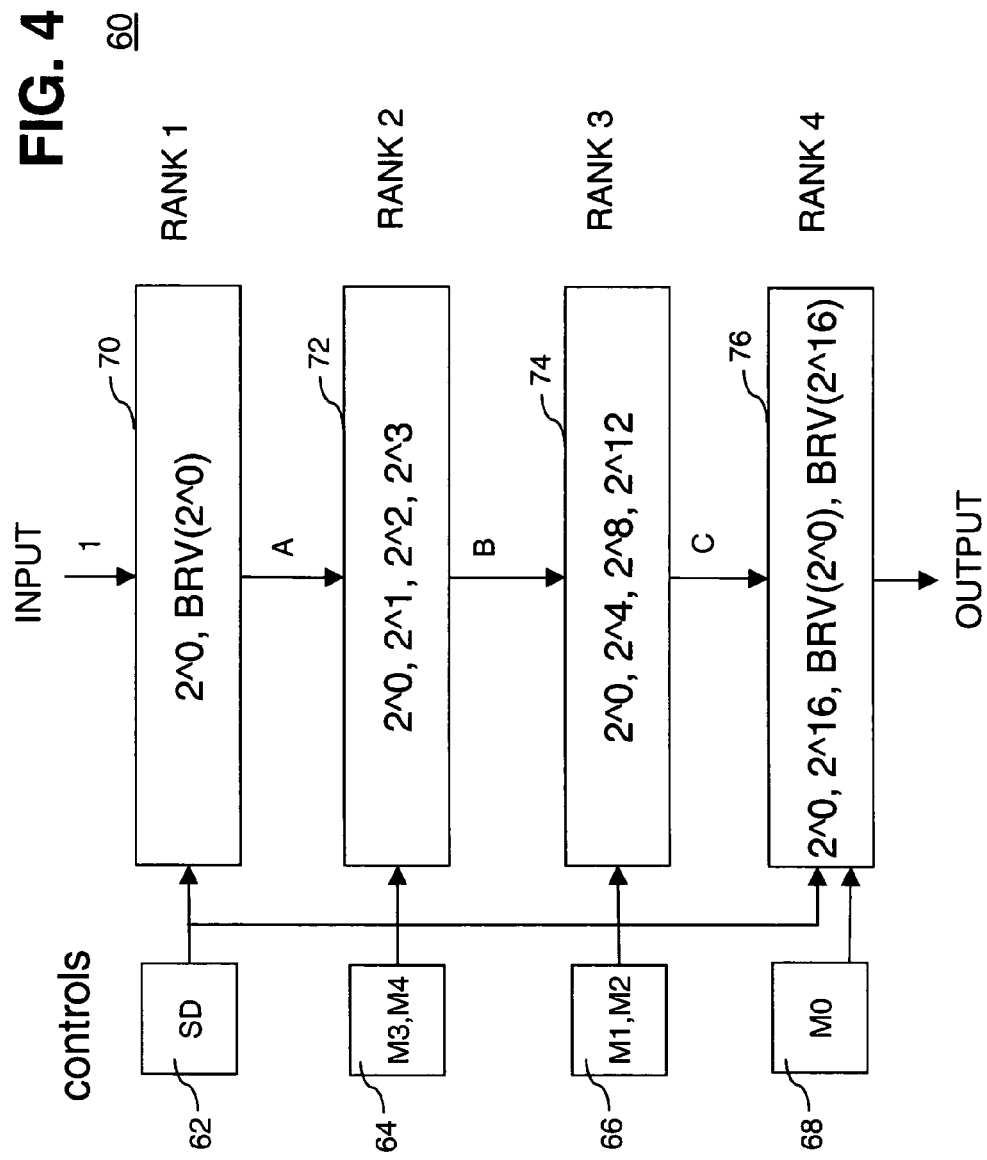
FIG. 4 depicts an exemplary block diagram of a parallel shifter in accordance with the present invention.

Included within the GPR datapath unit 26 is a parallel shifter 60 as shown in FIG. 4. The appendix includes file slr32_v.txt, which has an example of a 32-bit Verilog implementation of such a parallel shifter. The logic is ranked into four sections, Rank 1 through Rank 4. The logic in each rank consists of cells of various types. Rank 1 (70) contains 1 cell, Ranks 2 and 3 (72 and 74 respectively) have 4 cells each, and rank 4 (76) has 2 cells. This makes for a total of 11 cell types.

When synthesized from structural Verilog, the complete parallel shifter only requires 224 LUTs in Virtex-E. This is more optimum than synthesis using behavioral Verilog, which results in a utilization of 340 LUTs. In addition, in an example using a Virtex-E-8 FPGA, the logic in pure combinatorial form has a propagation delay of approximately 18 nS when tied to external IOB pads. This allows single-cycle operation at faster than 50 MHz rates. Pipelining may be done at relatively arbitrary places, such as in halfs, (approximately) thirds, or fourths of the ranked logic. The resultant clock speed may be well over 100 MHz, making this section of the datapath not a critical path. The decision of where to pipeline may be based on other factors, such as the design of the multiplier or how the adder/subtractor is pipelined. The SoftRISC datapath logic is essentially suitable for superscalar use, aside from an extreme minimum in LUT count for this particular embodiment of the core.

The control signals in FIG. 4 are SD (62) and M[0:4] (64, 66, and 68). These signals control the shift direction, and shift amount, respectively. Note that control signals and data bit-orderings in SoftRISC follow IBM architectural tradition. So, bit M[0] is the MSB, controlling shift placement with $2^4$ weighting.

Rank 1 selects between 2 input groups, whereas ranks 2–4 select among 4 input groups. At the cell level, the rank 1 input groups are nomenclatured P and Q. The rank 2–4 cells have their input groups nomenclatured P, Q, R & S. The control signals effecting these selections are SD and rank-specific subset of M[0:4]. This division is shown in FIG. 4. In the cell logic, the fill bit may be indicated by the signal F (not shown).

With respect to DSP capabilities, the parallel shifter logic may be optimized to split the shift direction control signal into two lines, one at rank 1 of the logic, and the other at rank 4 (note that FIG. 4 has them joined). This allows a selective bit-reverse capability to the datapath logic, which enables effective FFT addressing modes for enhancing the SoftRISC core with an extended instruction set for DSP operations.

An exemplary SoftRISC processor in accordance with the present invention can have the following general resource characteristics:

32-bit datapath, registers, and instructions

16 General Purpose Registers (GPRs)

7 Special Purpose Registers (SPRs)

Simple, balanced instruction set 6 instruction forms 32-bit address space, byte-addressed Byte, half-word, and word addressing Big endian byte ordering (although, other embodiments can use little endian byte ordering)

Bit and Byte Ordering

With respect to data, a SoftRISC processor can be considered to have a big endian architecture. The order of bits and bytes within a 32-bit word can follow that of the On-Chip Peripheral Bus (OPB) specification, which is the processor bus interface used within many Xilinx FPGAs, or can follow that of any other bus architecture. FIG. 5 illustrates the numbering and order of bits and bytes within the 32-bit word of the processor. The most significant bit is bit 0, and the least significant bit is bit 31.

Addresses

The way that individual bytes can be addressed within a 32-bit word is shown in FIG. 6. As was the case with data, for addresses the most significant bit is bit 0, and the least significant bit is bit 31, and these bits can be ordered in the same way as for data. The bit layout of an address is depicted in FIG. 7.

Addresses are essentially unsigned 32-bit integers, and have resolution for bytes, half-words (16 bits) and words. The SoftRISC processor can be a load-store computer capable of addressing memory in at least the three aforementioned resolutions of data size. When addressing bytes, as depicted in FIG. 8, all 32 bits are used to address memory.

Addressing for half-words can select either the right or left half of a 32-bit word. As shown in FIG. 9, when addressing half-words, only the most significant 31 bits of an address are used. The least significant bit 31 does not participate in a half-word address. The ordering of 16-bit half-words within the 32-bit word is analogous to the byte ordering. The lower half-word resides in bits 16–31, whereas the upper half-word resides in bits 0–15.

Similarly, when addressing words, only the most significant 30 bits are used, with the 2 least significant bits ignored. Because instructions in SoftRISC are always 32-bits in length and aligned to word boundaries, instructions also use only the most significant 30 bits of an address. Exemplary word addressing is illustrated in FIG. 10.

The SoftRISC architecture preferably uses a register model having for example 7 Special-Purpose Registers (SPRs) and 16 General-Purpose Registers (GPRs). This number of GPRs was chosen for efficient implementation in certain FPGAs, but is not necessarily limited thereto. In one embodiment, all registers are 32-bits in size. The appendix includes file gpr_regfile_v.txt, which has an example of a GPR register file in accordance with the present invention.

Special-Purpose Registers can include a Program Counter, a Processor Status Register, a Debug Instruction Register, and a Debug Data Register. The Program Counter, or pc, can be a 32-bit register that holds the address of the next instruction to be fetched from memory. By design, the instructions of the SoftRISC processor are all the same size, namely 32-bits in size for this embodiment. As a result, instruction addressing to memory is always aligned to a 32-bit word boundary. Hence, only the 30 most significant bits (MSBs), or bits 0–29, of the pc participate in instruction addressing. In instruction addressing, the two least significant bits are considered to be zeros, regardless of the actual value stored in the pc. The pc is illustrated in FIG. 11.

The Processor Status Register, or psr can be a 32-bit register used in implementations to provide arithmetic and logical status flags, and to provide bitfields for capability assertion for control and management of interruption, timers, traps, caches, and buses. In the SoftRISC architecture, only some of the psr bitfields are defined architecturally. Referring to FIG. 12, an illustration of the defined bitfields is shown. The functionality of psr bits 0–3 are defined in the following table:

| psr (0) | N | negative flag |
|---------|---|---------------|
| psr (1) | V | overflow flag |
| psr (2) | C | carry flag    |
| psr (3) | Z | zero flag     |

These flags are the machine status flags. Bit 18 (TE) is the trap enable indicator, which enables the trap instruction when asserted. Bit 19 is the interrupt enable indicator, which enables external interrupts from within the FPGA when asserted. Bits 20–31 contain the IV12 interrupt vector. Bits 4–17 are dependent on the particular implementation of the SoftRISC as a soft core.

The Debug Instruction Register or dir can be used to insert a single instruction from an external JTAG controller for diagnostic and debugging use. The dir, shown in FIG. 13 is not directly readable or writeable by any resource in the processor and in this embodiment is only usable when the processor is in a halt state. The Debug Data Register or ddr can be used to read processor internal registers, either GPRs or SPRs. The GPRs as indicated previously, can be 16 32-bit GPRs, R0–R15. Data transmission preferably occurs over an external JTAG controller that is linked with a GDB debugger on a development host computer. The ddr, shown in FIG. 14, can only be written to by the D-form instructions, which use the P-field.

The Debug Address Register or dar is used to address data for memory access using an external JTAG controller. The capability is designed to be coordinated with the ddr and the dir using the GDB debugger. The dar, shown in FIG. 15, can only be read from by the D-form instructions, which use the P-field.

Two additional SPRs in the SoftRISC architecture are the Context Registers 0 and 1, or CR0 and CR1. These registers are used for storage of the processor state, such as PC return address and the PSR context data, during traps and interrupts, and are illustrated in FIGS. 16 and 17.

The SoftRISC instructions are introduced in mnemonic form as follows: and or xor add sub sh rot mul br bnz bz bnc bc bnv by bnn bn blt bgt imm and_spr or_spr rts rft jrr jsr trap gdb_rd gdb_wr ld st rfu The following is a summary of the Opcodes and Forms:

| instruction | opcode | form |
|-------------|--------|------|
| and         | 0      | A    |
| or          | 1      | A    |
| xor         | 2      | A    |
| add         | 3      | A    |
| sub         | 4      | A    |
| sh          | 5      | A    |
| rot         | 6      | A    |
| mul         | 7      | A    |
| br          | 8      | B    |
| bnz         | 9      | B    |
| bz          | 10     | B    |
| bnc         | 11     | B    |
| bc          | 12     | B    |
| bnv         | 13     | B    |
| by          | 14     | B    |
| bnn         | 15     | B    |
| bn          | 16     | B    |
| bit         | 17     | B    |
| bgt         | 18     | B    |
| imm         | 19     | C    |
| and_spr     | 20     | D    |
| or_spr      | 21     | D    |
| rts         | 22     | D    |
| rft         | 23     | D    |
| jrr         | 24     | D    |
| jsr         | 25     | D    |
| trap        | 26     | D    |
| debug_rd    | 27     | D    |
| debug_wr    | 28     | D    |
| ld          | 29     | M    |
| st          | 30     | M    |
| rfu         | 31     | X    |

The arithmetic and logical instructions, which use the A-Form instruction, are: and, or, xor, add, sub, sh, rot, and mul. The A-Form instructions (FIG. 1A) include an AM-field that describes an arithmetic mode AM[0:3] for use with these instructions. In particular, AM[0] may be a non-store enable bit (for not storing T), AM[1] may be a left-or-right bit (for determining direction of a function), AM[2] may be a zero-or-sign fill bit (for determining whether a result should be zero-filled or sign-extended), and AM[3] may be a with-carry bit (for enabling carry). Not all arithmetic and logical operators support all the arithmetic modes. As noted earlier, the typical operation performed is T=R op S.

The and instruction performs a bitwise and of GPRs R and S. The or instruction performs a bitwise or of GPRs R and S. The xor instruction performs a bitwise xor of GPRs R and S. The add instruction performs a two's complement addition of GPRs R and S. The sub instruction performs a two's complement subtraction of GPRs R and S.

The sh instruction performs a left or right shift operation on GPR R, shifting a number of bits specified by GPR S[27:31]. Note that effect of the instruction may be modified through the use of the left-or-right and zero-or-sign fill bits of the AM-field. The rot instruction performs a left or right (based on the value of the left-or-right AM-field bit) circular rotate operation on GPR R, rotating a number of bits specified by GPR S[27:31]. The mul instruction performs an unsigned multiplication operation on the lower half-words of GPRs R and S (e.g., R[16:31] and S[16:31]) to produce an unsigned 32-bit result in GPR T.

The branch instructions, which use the B-form instruction (FIG. 1B), are: br, bnz, bz, bnc, bc, bnv, by, bnn, bn, blt, and bgt. One bit of the 2-bit BM-field may be used to indicate whether the branch instruction is pc-relative or absolute and the other bit may be used to indicate whether the instruction immediately following the branch instruction should be executed (for compiler optimization). Since instructions are aligned to word boundaries, the A22 immediate data can be left-shifted by two places (with zeros filling in at bits 30 and 31) for branch instructions. When used as an offset to the pc (program counter), the A22 immediate data is treated as a 2's complement number and sign extended. This allows for both positive and negative offsets. When used as an absolute address, only lower 21 bits of the A22 immediate data are used (the sign bit is ignored) and the remaining upper bits are zero-filled to form the complete address.

The br instruction is an unconditional branch. The bnz instruction is a conditional branch not zero that branches if the psr zero flag (psr(3)) is not asserted. The bz instruction is a conditional branch zero that branches if the psr zero flag is asserted. The bnc instruction is a conditional branch not carry that branches if the psr carry flag (psr(2)) is not asserted. The bc instruction is a conditional branch carry that branches if the psr carry flag is asserted.

The bnv instruction is a conditional branch not overflow that branches if the psr overflow flag (psr(1)) is not asserted. The by instruction is a conditional branch overflow that branches if the psr overflow flag is asserted. The bnn instruction is a conditional branch not negative that branches if the psr negative flag (psr(0)) is not asserted. The bn instruction is a conditional branch negative that branches if the psr negative flag is asserted.

The blt instruction is a conditional branch less than that branches if (N xor V) is true, where N is the psr negative flag (psr(0)) and V is the psr overflow flag (psr(1)). The bgt instruction is a conditional branch greater than that branches if (Z and not(N xor V)) is true, where Z is the psr zero flag (psr(3)), N is the psr negative flag, and V is the psr overflow flag.

The next group of instructions provides capabilities for managing exceptions, modifying program flow (non-branching), and reading/writing diagnostic data. These instructions use the D-Form instruction (FIG. 1D) and include: and_spr, or_spr, jsr, rts, jrr, trap, rft, debug_rd, and debug_wr.

The and_spr and or_spr instructions allow for indirect bitwise control over SPRs. The and_spr instruction performs a bitwise and between a general purpose register (GPR) and a special purpose register (SPR), and allows for bit-clearing specified fields of the SPR. The or_spr instruction performs a bitwise or between a GPR and a SPR, and allows for bit-setting specified fields of the SPR. For both instructions, the S-field specifies the source GPR, and the P-field specifies the target SPR.

The jsr and rts instructions provide subroutine and return capabilities. Specifically, the jsr instruction performs a jump subroutine operation that stores a return address (e.g., address of the instruction following the jsr instruction) in the memory word addressed by GPR T, and then uses the address stored in GPR S to set the value of the program counter (pc). After executing the subroutine, the rts instruction can be used to perform a return from subroutine operation that retrieves the previously stored return address from the memory word addressed by register T and sets the pc to that stored value. The jrr instruction performs an unconditional jump register relative. The signed value stored in GPR S is added to the current pc value to generate the new pc value. This operation is similar to an unconditional relative branch instruction except that a much larger addressing range is possible since the full 32-bit signed value of the S register is available.

The trap and rft instructions are used to provide running programs with a synchronous interrupt capability. The trap instruction performs an unconditional trap that first saves the current context of the processor, and then starts execution at an address specified by the trap vector TV12 (embedded within the trap instruction). The context may be saved in the context registers CR0 and CR1, where the return address (e.g., the instruction following the trap instruction) is stored in CR0 and the current state of the psr (processor status register) is stored in CR1. Similarly to branch instructions, the value of TV12 may be left shifted by two places (since addresses are word-aligned) and zero-filled to form an address used to set the pc. The rft instruction performs a return from trap after processing a synchronous interrupt. The rft instruction may cause the psr to be loaded with the data stored in CR1 and the pc to be updated with the data stored in CR0.

The debug_rd and debug_wr instructions may be used with a debugger to provide access to diagnostic data. The debugger may be running on an external system and coupled to the SoftRISC processor through a JTAG or other hardware interface. The debug_rd instruction allows the value of any GPR register S to be stored in any writeable SPR, which is specified by the P-field. Similarly, the debug_wr instruction allows any SPR, specified by the P-field, to be written to a GPR S.

The ld and st instructions provide memory reference capabilities and use the M-form instruction (FIG. 1E). The TM-field provides for various transfer modes for both instructions. In particular, two bits of the TM-field may be used to indicate the size of the data to be transferred (e.g., byte, half-word, sign-extended half-word, or word). Another bit of the TM-field may be used to implement lock and unlock capabilities. When a memory reference is performed with a lock, the state of the interrupts and the traps in the psr may be stored and all interrupts and traps may then be immediately disabled. This remains in effect until a memory reference is performed with an unlock transfer mode, whereupon the previous state of interrupts and traps is restored and interrupts and traps are enabled. This lock/unlock transfer mode capability allows programs with critical regions to execute unimpeded. The final bit of the TM-field may be used to synchronize a memory reference in order to prevent read after write hazards (which may occur due to pipelining). When a memory reference is initiated with the sync bit set, all memory load and store operations are forced to run to completion, thereby synchronizing the instruction pipeline with I/O.

The ld instruction moves data from memory to the processor using the transfer mode specified by the TM-field. The st instruction moves data to memory from the processor using the specified transfer mode. In a preferred embodiment, if the S and R are the same GPR register, the memory address for either the load or the store operation may be obtained by adding the value of GPR S to the SI8 data embedded in the instruction. If S and R refer to different GPR registers, the memory address may be obtained by adding the values of GPR S and R together and adding the SI8 data.

Finally, operation of the imm instruction is explained in greater detail below and operation of the rfu instruction is explained in greater detail above.

The immediate instruction (imm) solves two particular problems that merged at the hardware/software boundary in the design of the SoftRISC processor. First, a need was recognized to have a powerful immediate capability in the computer architecture in order to facilitate bitfield masking, loading of immediate values, and arithmetic with small constants. A particularly difficult constraint is that a simple system for having an impact on 32-bit registers has to be accomplished with a 32-bit instruction that cannot have all of its bits dedicated to a literal field. Immediate operations are used quite often by compilers for indexing and loop iteration. Secondly, it is desirable for the implementation of immediate capability to be efficient for FPGA realization. Therefore, elements necessary for software could not end up being very expensive in FPGA hardware resource utilization.

An effective solution that resolves both problems is using a half-word literal field in the instruction word (refer to FIG. 22) that can impact a whole 32-bit word logically or arithmetically through a combination of modes that variously manipulate the distribution of the 16 literal bits across a 32-bit word. The 16 literal bits of the instruction may be treated as a lower- or upper-half word, zero-/one-filled, sign-extended, or just replicated 1-bit for 2-bits. This last capability, known as duplexing or doubling, is very efficient for FPGA implementation because decoding logic in alternative schemes to assign literal bit-values based on bit-position became unnecessary. The immediate instruction function essentially uses a single word instruction having N (16 in one embodiment) possible modes with half of the instruction bits allocated to immediate data. The immediate instruction can also have a predetermined number of arithmetic-logical operating modes and a predetermined number of different bit mask generation modes.

In one embodiment, the imm, or immediate instruction, has 4 arithmetic-logical operating modes and 6 different bit mask generation modes. Taken together, these sets of 4 modes and 6 modes form a matrix of composite instructions imm that are encoded by the CM-field of this sole C-Form instruction.

The 4 arithmetic-logical operating modes supported are: AND, OR, XOR, and ADD. These operations differ from A-Form instructions in that three-address register selection is not done. Instead only one GPR register is selected by the T-field of the instruction to be a source and destination register.

The arithmetic-logical operating modes are typically used as follows. The AND mode is used for zeroing unwanted literal bits, or for masking of an operand (such as prior to shifting). The OR mode is used for inserted desired literal bits into the selected GPR. When complementing select bits of an operand in the GPR is necessary, the XOR mode is used. For doing immediate arithmetic operations, such as for loop and iteration counting, the ADD mode is used.

The 4 main bit mask generation modes are named LOW, HIGH, DPLX, and SIGN, with 2 additional modes FILL LOW and FILL HIGH. Each of these modes causes a certain action to take place with the I16 immediate data embedded in the instruction. These modes, and some of their uses will be further detailed below.

In the case of the LOW bit mask generation mode, the I16 immediate data bits are processed as shown in FIG. 18. The 16-bits are distributed in the lower 32-bits of the word, bits 16–31. The unoccupied bits 0–15 may be zero-filled. Alternatively, the unoccupied bits may be one-filled, which may facilitate use with AND functions, by using the FILL LOW mode. The low bit mask generation mode can be used to insert literal bits into the lower half-word of a GPR, or as the one of a pair of instructions to insert a full 32-bit literal.

The HIGH bit mask generation mode works similarly to the LOW mode for the upper 16 bits of the word. The I16 immediate data bits are processed as shown in FIG. 19. The 16-bits are distributed in the upper 32-bits of the word, bits 0–15. The unoccupied bits 16–31 may be zero-filled. Alternatively, the unoccupied bits may be one-filled, which may facilitate use with AND functions, by using the FILL HIGH mode. The high bit mask generation mode can be used to insert literal bits into the upper half-word of a GPR, or as the one of a pair of instructions to insert a full 32-bit literal.

For creating nybble, byte, and half-word mask values flexibly and quickly, the DPLX bit mask generation mode is used. Each bit of the I16 immediate data is duplexed into 2 adjacent bits in a 32-bit bit mask. Through the simple technique of bit-duplication, the generation of either left- or right-aligned masks is possible. The I16 immediate data bits are processed as shown in FIG. 20.

In the case of the sign bit mask generation mode, the I16 immediate data bits are processed as shown in FIG. 21. In essence, the I16 immediate data is treated as a 16-bit signed integer, and sign-extended across all 32-bits of the bit mask. When combined with ADD operating mode, a GPR can be quickly incremented or decremented by a constant value, such as for iteration counting, or computed address offsets for array indexing.

The table in FIG. 23 summarizes all of the constant modes supported in the imm instruction. This table illustrates the required CM-field bit pattern, the pair-wise combination of bit mask generation and operation mode, and the composite immediate instruction that is formed. AS shown, the immediate instruction function has 6 ways in which the bits in the immediate word are used as a mask and such masking is done in the context of 16 possible composite immediate instructions due to the CM[0:3] mode bits within the instruction. More specifically, the immediate instruction treats the half-word literal field as one among a lower-half word (LOW) or an upper-half word (HIGH), a one-filled (FILL LOW) or a one-filled word (FILL HIGH), a sign-extended word (SIGN), or replicated 1-bit for 2-bits word (DUPLEX). Also, the immediate instruction function includes possible composite immediate instructions selected from the group of instructions comprising AND_FILL_LOW, OR_LOW, XOR_LOW, ADD_LOW, AND_FILL_HIGH, OR_HIGH, XOR_HIGH, ADD_HIGH, AND_DUPLEX, OR_DUPLEX, XOR_DUPLEX, ADD_DUPLEX, AND_SIGN, OR_SIGN, XOR_SIGN, and ADD_SIGN. FIG. 22 shows the actual imm machine instruction bit patterns.

The variable combinations possible with the constant modes of the immediate instruction, especially when combined with another instruction (including possibly another immediate mode instruction), afford powerful capabilities, for example for the C compiler to emit indexing or loop accounting code, as well as for operand masking and shifting. The composite immediate instructions are relatively simple, and are included in the SoftRISC architecture because of their efficient FPGA realization.

In light of the foregoing description of the invention, it should be recognized that the present invention can be realized in hardware, software, or a combination of hardware and software. A method and system for dynamic reconfigurable computing of a system having at least one microprocessor implemented on a field programmable gate array according to the present invention can be realized in a centralized fashion in one computer system, or in a distributed fashion where different elements are spread across several interconnected processing modules. A typical combination of hardware and software could be a general purpose computer system with a computer program that, when being loaded and executed, controls the computer system such that it carries out the invention described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A reduced instruction set computer architecture implemented on a programmable logic device, comprising:
    a parallel bit shifter capable of reversible shifts and bit reversals;
    a Reed-Muller Boolean unit coupled to the parallel bit shifter;
    an immediate instruction function that, via constant modes, variously manipulates distribution of a set of literal bits of a half-word literal field from an instruction word across a full-length data word; and
    wherein at least one of the constant modes causes each bit of the half-word literal field to be doubled into two adjacent bits in the full-length data word.

2. The reduced instruction set computer architecture of claim 1, wherein the parallel bit shifter is a parallel 32-bit shifter.

3. The reduced instruction set computer architecture of claim 1, wherein the parallel bit shifter comprises logic ranked into four sections.

4. The reduced instruction set computer architecture of claim 3, wherein the parallel bit shifter further comprises a split shift direction control signal applied on at least two of the four sections.

5. The reduced instruction set computer architecture of claim 1, wherein the Reed-Muller Boolean unit performs any Boolean operation with two operands and an inverse of the Boolean operation on data words by changing only a single control bit value.

6. The reduced instruction set computer architecture of claim 1, wherein the Reed-Muller Boolean unit multiplexes between two input operands by transposition of lone control bits.

7. The reduced instruction set computer architecture of claim 1, wherein the immediate instruction function treats the half-word literal field as one among a lower-half word, an upper-half word, a zero-filled word, a one-filled word, a sign-extended word, or a replicated 1-bit for 2-bits word.

8. The reduced instruction set computer architecture of claim 7, wherein the constant modes of the immediate instruction function include composite immediate instructions selected from the group of instructions comprising AND_FILL_LOW, OR_LOW, XOR_LOW, ADD_LOW, AND_FILL_HIGH, OR_HIGH, XOR_HIGH, ADD_HIGH, AND_DUPLEX, OR_DUPLEX, XOR_DUPLEX, ADD_DUPLEX, AND_SIGN, OR_SIGN, XOR_SIGN, and ADD_SIGN.

9. A system-on-chip, comprising:
    a reduced instruction set computer processor implemented on a field programmable gate array fabric; and
    an instruction set utilizing resources from the field programmable gate array fabric, wherein the processor is synthesizable from hardware description language,
    wherein the instruction set consists of 32 instructions, and wherein each instruction of the instruction set is a same size; and
    wherein one instruction of the instruction set is an immediate instruction that, via constant modes, variously manipulates distribution of a set of literal bits of a half-word literal field from an instruction word across a full-length data word, and at least one of the constant modes causes each bit of the half-word literal field to be doubled into two adjacent bits in the full-length data word.

10. The system-on-chip of claim 9, wherein the same size is 32 bits.

11. The system-on-chip of claim 9, wherein one instruction of the instruction set is a reserved for future use (rfu) instruction.

12. The system-on-chip of claim 9, wherein a series of bitfield layouts of machine words are arranged and constructed for compatibility with on-chip intellectual property cores.

13. The system-on-chip of claim 12, wherein the series of bitfield layouts are arranged and constructed for use with standard processor buses.

14. The system-on-chip of claim 9, wherein the processor includes at least 16 general purpose registers and 7 special purpose registers.

15. The system-on-chip of claim 9, wherein bitfield layouts for instruction formats and instruction ordering are arranged for efficient use of FPGA resources.

16. The system-on-chip of claim 9, wherein instruction formats include a balance of single and paired instructions well-suited for compilation, such that after a first-issued instruction is considered by a compiler for issue, the compiler beneficially considers no more than 30 alternative instructions for a second-issued instruction to pair with the first-issued instruction.

17. The system-on-chip of claim 9, wherein instruction formats include a balance of single and paired instructions well-suited for a C runtime software environment, such that instruction sequences required to implement C language constructs naturally break into instruction sequences comprising one or two instructions.

18. The system-on-chip of claim 17, wherein the single and paired instructions minimize interrupt latency.

19. The system-on-chip of claim 17, wherein a minimal instruction overhead and the single and paired instructions facilitate interrupt driver software design directly in the C language.

20. The system-on-chip of claim 9, wherein the processor is based on a 32-bit architecture.

21. The system-on-chip of claim 9, wherein the processor comprises at least one among a balanced instruction set; a set of six instruction forms; a byte-addressed 32-bit address space; addressing by word, half-word, or byte; a little endian byte ordering; and big endian byte ordering.

22. The system-on-chip of claim 9, wherein the processor is based on one among a 16-bit, a 32-bit, a 64-bit, a 128 bit, a 256-bit, a 512-bit and a 1024-bit architecture.

23. A method of forming a reduced instruction set computer processor, comprising the steps of:
  embedding a processor core on a field programmable gate array;
  deploying a simple instruction set optimized for a compiler, wherein the processor is directly synthesizable from a hardware description language,
  wherein the instruction set consists of 32 instructions, and wherein each instruction of the instruction set is a same size; and
  wherein one instruction of the instruction set is an immediate instruction that, via constant modes, variously manipulates distribution of a set of literal bits of a half-word literal field from an instruction word across a full-length data word, and at least one of the constant modes causes each bit of the half-word literal field to be doubled into two adjacent bits in the full-length data word.

24. The method of claim 23, wherein one instruction of the instruction set is a reserved for future use (rfu) instruction.

25. The method of claim 23, wherein embedding the processor core comprises configuring the field programmable gate array to include a parallel bit shifter capable of reversible shifts and bit reversals and a Reed-Muller Boolean unit coupled to the parallel bit shifter.

26. A reduced instruction set computer architecture implemented on a programmable logic device, comprising:
  a parallel bit shifter capable of reversible shifts and bit reversals;
  a Reed-Muller Boolean unit coupled to the parallel bit shifter; and
  an immediate instruction function used in conjunction with the parallel bit shifter and Reed-Muller Boolean unit, wherein the immediate instruction function uses a single word instruction having N possible modes and having a plurality of instruction bits, with half of the plurality of instruction bits of the single word allocated to immediate data;
  wherein the immediate instruction function further includes a predetermined number of separate bit mask sub-modes, and the separate bit mask sub-modes are selected from the group of bit mask sub-modes comprising FILL LOW, FILL HIGH, LOW, HIGH, DUPLEX, and SIGN bit masks; and
  wherein the LOW bit mask sub-mode is used for at least one of inserting literal bits into a lower half-word of a general purpose register and inserting as one of a pair of instructions for a full-word literal, the HIGH bit mask sub-mode is used for at least one of inserting literal bits into an upper half-word of a general purpose register and inserting as one of a pair of instructions for a full-word literal, the DUPLEX bit mask sub-mode is used for creating nybble, byte and half-word mask values flexibly, and the SIGN bit mask sub-mode is used for incrementing or decrementing a general purpose register by a constant value when combined with an ADD operating mode wherein the DUPLEX bit mask sub-mode causes each bit of a half-word literal field to be doubled into two adjacent bits in a full-length data word.

27. The reduced instruction set computer architecture of claim 26, wherein the immediate instruction function has 16 possible modes.

28. The reduced instruction set computer architecture of claim 26, wherein the immediate instruction function further includes a predetermined number of separate arithmetic logical operating modes that are are selected from the group comprising AND, OR, XOR, and ADD, and
  wherein the AND mode is used for at least one of zeroing unwanted literal bits and masking of an operand, the OR mode is used for inserting desired literal bits into a selected general purpose register, the XOR mode is used for complementing select bits of an operand in a general purpose register when necessary, and the ADD mode is used for immediate arithmetic operations.

29. A system-on-chip, comprising:
  a reduced instruction set computer processor implemented on a programmable logic device fabric;
  an instruction set utilizing resources from the field programmable gate array fabric, wherein the processor is synthesizable from hardware description language; and
  a horizontally scalable immediate instruction using multiple vectorized versions of an N-bit architecture; and
  wherein one mode of the immediate instruction causes each bit of a half-word literal field to be doubled into two adjacent bits in a full-length data word; and
  wherein the reduced instruction set computer processor is a digital signal processor wherein the digital signal processor generates two N-bit words of constant data using an N/2 bit immediate instruction having N/4 bits dedicated for immediate data.

30. The system-on-chip of claim 29, wherein the horizontally scalable immediate instruction concurrently uses multiple vectorized versions of the N-bit architecture.

31. The system-on-chip of claim 29, wherein the N-bit architecture can be selected among multiple 16-bit, 32-bit, 64 bit, 128-bit, 256-bit, 512-bit and 1024-bit vectorized versions.

32. The system-on-chip of claim 29, wherein the N-bit architecture can be selected among multiple 18-bit, 36-bit, 72 bit, 144-bit, 288-bit, 576-bit and 1152-bit vectorized versions.

33. The system-on-chip of claim 29, wherein the two N-bit words comprise constants for a Fast Fourier Transform.

34. The system-on-chip of claim 29, wherein the two N-bit words comprise in-phase and quadrature data for complex signal processing.

35. The system-on-chip of claim 29, wherein the instruction set further comprises a reserved for future use (rfu) instruction that enables vertically scalable architectural variants implemented on the field programmable gate array fabric.

36. The system-on-chip of claim 35, wherein the rfu instruction enables upward compatible single and double-precision floating-point arithmetic operations via the field programmable gate array fabric.

37. The system-on-chip of claim 36, wherein the rfu instruction uses a single standard extension at a hardware/ software boundary for variant architectures while minimally impacting a compiler design for the variant architectures.

* * * * *